Sept. 19, 1950  G. E. LOFGREN  2,522,882
VACUUM CLEANER

Filed Aug. 14, 1945  2 Sheets-Sheet 1

INVENTOR.
Gustof E. Lofgren
BY R. T. Sperry

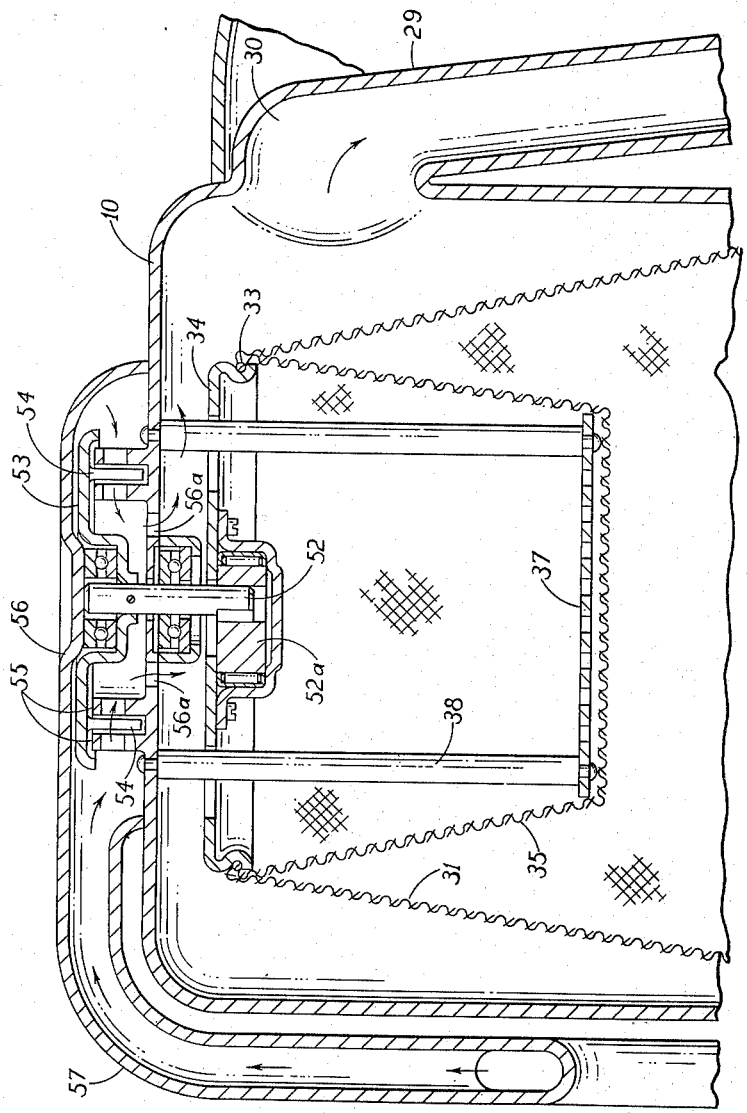

Patented Sept. 19, 1950

2,522,882

UNITED STATES PATENT OFFICE 2,522,882

VACUUM CLEANER

Gustaf E. Lofgren, Riverside, Conn., assignor to Electrolux Corporation, Old Greenwich, Conn., a corporation of Delaware Application August 14, 1945, Serial No. 610,805

4 Claims. (Cl. 183—58)

This invention relates to vacuum cleaners and is particularly concerned with dust separation, collection and removal by such cleaners.

Problems of efficiency and effectiveness in removing dust by and from domestic and industrial cleaners has formed a considerable portion of the development work directed towards such cleaners since their inception. In most present day commercially successful household cleaners, the dust is collected within a flexible bag which itself forms the separating member of the unit and difficulties are experienced in providing practical means for the discharge of collected dust from such bags. In industrial cleaners, it is more common to provide a relatively fixed cloth dust screening member under which a collection receptacle is mounted which may be removed from the unit for discharge of the collected dust. In the latter type devices, since the dust screening fabric is not normally removed from the cleaner, difficulty has been encountered in providing for the periodic removal of the adhering dust from such screen and since adhesion of such dust thereto greatly affects the efficiency of the operation of the device this problem presents a major difficulty in the design of a commercially successful device of this character.

It is therefore among the prime objects of the present invention to provide effective and efficient means for the removal of adhering dust from a dust screening member whereby such adhering dust and dirt is loosened from the screen and subsequently disposed of.

A more specific object of the invention is to provide a new and improved agitating means for use in a vacuum cleaner by which the dust separating member may be so moved as to dislodge adhering dust from the interstices thereof.

A still further important object of the invention is to provide a novel and improved cleaner in which the means for creating the suction may be used at the will of the operator for dislodging adhering dust from the dust separating member.

A still further object of the invention is to provide means whereby the suction normally applied for drawing in dust laden air may be used to actuate a vibrating member supporting the dust screen.

A further and more general object of the invention is to provide a new and improved vacuum cleaner embodying various cooperating, combining, and correlating features of the structure, thus to provide a cleaner which will be efficient and effective and well within the limits of economic manufacture.

Numerous other objects and features of the present invention will be apparent from the following specification taken in conjunction with the accompanying drawing, in which:

Fig. 5 is a cross section view similar to Fig. 3, but showing a portion of the device on an enlarged scale.

Figure 1:
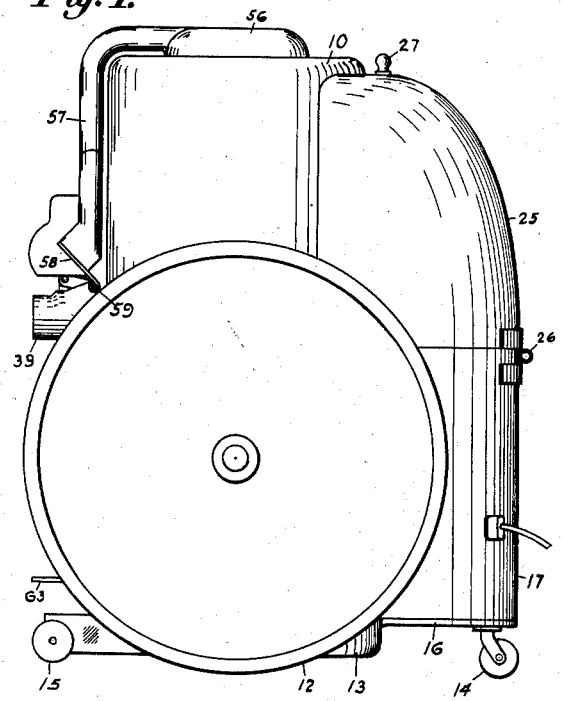
Fig. 1 is a side elevation of one preferred embodiment of the present invention.
Figure 2:
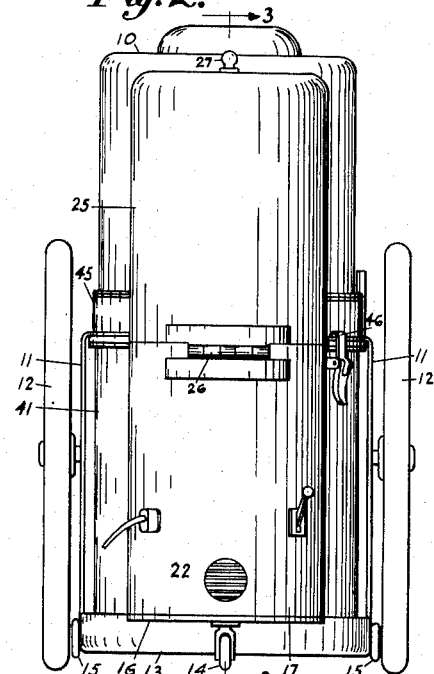
Fig. 2 is a rear elevation of that form of the invention shown in Fig. 1.

The present specification refers to a "domestic" cleaner and "commercial" type cleaner. The distinction here sought to be brought out is that the "commercial" type cleaner of which the present concept is an illustration is characterized by a normally permanent fabric filtering screen under which is mounted a dust receiving compartment while the "domestic" cleaner is characterized by a dust separating member formed by a removable dust collecting receptacle such as a bag supported from the handle or a bag removably mounted within the chamber of a tank type cleaner. Such terminology is used merely for convenience since it is obvious that the present inventive concept in the exact form here shown or in a modified form thereof may be used for domestic cleaning as well as industrial purposes.

While the present inventive concept embraces numerous structural features, combinations and novel and improved relationships of structural elements, an important feature of the concept is the provision of an air flow actuated filter screen agitator which utilizes the air flow created by the normal suction motor of the cleaner, means being provided by which the air flow is diverted from the screen to the agitating member so that during agitation air flow through the screen is terminated and adhering dirt and dust may be loosened and dropped from the screen without being subjected to suction through the screen during agitation which would otherwise impede the dislodgement of such particles.

Referring now more particularly to the drawings, it will be seen that the present embodiment of the invention consists of a substantially slender cylindrical body section 10 which is mounted for support upon a frame 11 which is in turn supported by side wheels 12 which render the structure easily transportable. The frame 11 also includes a bottom supporting platform 13 which is provided with a rear supporting caster 14 which is normally in contact with the supporting surface and is also provided with a forward roller 15 which limits the forward tilting movement of the structure. It will, of course, be understood that the caster 14 and the roller 15 are mounted on the supporting platform 13 on the opposite sides of the axis of the wheels 12 and the roller 15 is elevated above the caster 14 so as to permit a limited tilting motion of the platform, the roller 15 normally being out of contact with the supporting surface.

Platform 13 has a rearwardly extending portion 16 which supports thereon a housing 17 with a motor fan unit, the unit being mounted vertically within the housing 17 and the motor 18 being concentrically supported within the casing by a suitable rubber mounting 19 permitting vibrations of the motor without imparting such vibration to the housing 17. The fan 20 is located above the motor 18 and is adapted to draw air inwardly through a transversely extending filter 21, the air passing through the fan and motor and being exhausted to the atmosphere through an exhaust opening 22 preferably provided with suitable deflectors to direct the air upwardly away from the floor.

Figure 4:
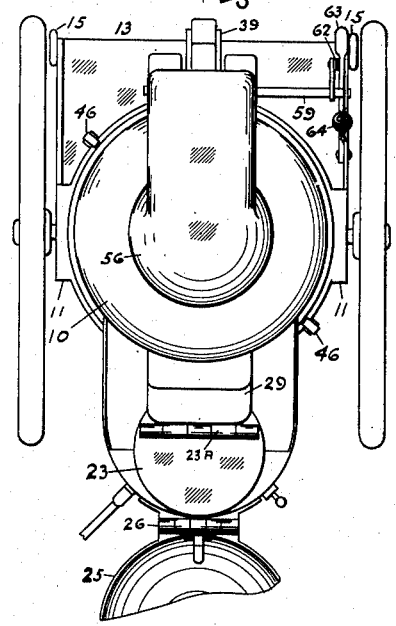
Fig. 4 is a top plan view of the device.

The housing 17 is closed at the top by a transversely extending plate 23 which constitutes the floor of a tool or accessory compartment 24 the floor being hinged as at 23A to provide access to the filter and motor fan unit. The accessory compartment 24 is normally enclosed by a cover member 25 hinged as at 26 to the housing 17 and provided with a manipulating handle 27 so that it may be opened as shown in Fig. 4 for the insertion or removal of the cleaning tools and equipment such as brushes and cleaning nozzles. Air is admitted to the housing 17 through an aperture 28 in the plate 23 to which air is conveyed by an air conduit 29. The upper end of the conduit 29 is sealed as at 30 to the rear wall of the casing 10 so that upon operation of the motor air is drawn from the casing through the conduit 29, filter 21, fan and motor unit, and is exhausted through the port 22.

For separating dirt and dust entrained by air drawn through the device, there is provided within the casing 10 a normally stationary reentrant type of dust screen which may preferably be made of fabric. The screen comprises external frustoconical section 31, the open mouth of which is secured to a ring 32 while its upper and smaller end is secured at 33 to a normally stationary supporting plate 34 from which the screen extends downwardly to form an internal frustoconical section 35, the side of which is joined by a bottom portion 36 of the screen. The screen is held in taut position by an apertured bottom plate 37 retained in its downward position by rods 38 extending downwardly from the casing 10. During the normal operation of the device air is admitted through the ring 32 from an air inlet hose connection 39 to which a suction hose having suitable cleaning implements is applied. Dust laden air is thus drawn through the ring 32 to the screen, the clean air passing from the opposite side of the screen through the conduit 29, the filter 21 restraining any fine particles of dust or dirt which are not retained by the screen, the clean air thereafter being discharged through the outlet 22 as hereinbefore described. Heavier particles of dirt and dust which do not adhere to the screen drop by gravity through an inverted frustoconical ring 40 mounted in communication with the ring 32 and therefrom into a removable dust receptacle 41 which is provided with a manipulating handle 42.

The receptacle 41 is normally urged upwardly with its flange 43 in engagement with a sealing gasket 44 carried by a circumferentially extending flange 45 of the casing 10 by means of securing clips 46. When it is desired to remove the receptacle 41, clips 46 are disengaged permitting the removal of the receptacle by manipulation of its handle 42.

In the normal operation of a cleaner of this type, dirt and dust particles will lodge within the interstices of the screen and will adhere thereto thus greatly diminishing its efficiency. Such diminishment is indicated by a difference in pressure between the incoming air through the connection 39 and the pressure within the casing 10 above the screen. With the screen completely clean, air will readily flow therethrough and there will be only a slight pressure difference between the air pressure at the connection 39 and in the casing above the screen. However, as the screen becomes loaded with dirt which adheres thereto, the pressure difference will increase, and as the resulting decreasing of the efficiency of the device is not always sensed by the operator who has no means of seeing the condition of the screen, it is therefore desirable to provide an indicator by which this characteristic may be noted. The present structure is therefore provided with an indicator 47, one side of which is open to the connection 39 by conduit 48 while the other side communicates with the casing 10 above the screen by conduit 49. The indicator is provided with a window 50 through which may appear a signal arm 51 actuated by the difference in pressure in the manner fully set forth in Patent No. 2,192,224, issued May 5, 1940. It will be understood that the specific structural details used form no part of the invention and if desired other types of indicators may be substituted for the one here shown by way of illustration.

Figure 3:
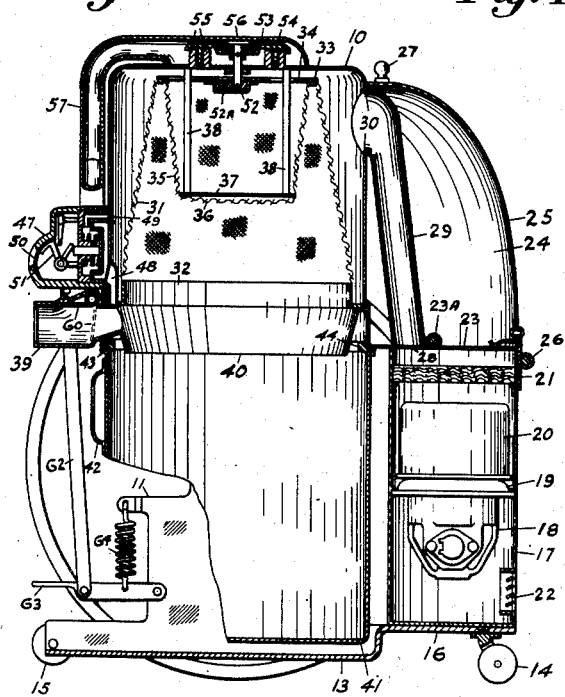
Fig. 3 is a central section taken on the line 3—3 of Fig. 2.

For loosening accumulated dust and dirt from the screen, there is provided an air actuated means or air motor for bodily moving plate 34 in a gyratory manner so as to vigorously agitate the various sections of the screen. To accomplish such motion the plate 34 is provided with a central aperture through which extends an actuating pin 52 which pin carries an eccentric 52A and is in turn carried by a rotor plate 53 of a turbine arrangement. Plate 53 carries turbine blades 54 which are mounted between inner and outer fixed turbine housings 55, the whole being mounted within a turbine casing 56 located on top of the casing 10. Openings 56a provide for flow of air from the turbine to that portion of the interior of casing 10 which is on the same side of the dust separating screen as is the air conduit 29 leading to the motor fan unit. This arrangement is such that when air is drawn through the turbine casing the pin 52 will revolve and eccentric 52A will move plate 34 in a gyratory path which will thus agitate the screen sections. Air is directed to the turbine casing 56 from a conduit 57 which is normally closed by a closure valve 58 which is pivoted to the connection 39. The closure valve 58 is mounted on a rocker arm 59 which extends through the connection 39 and has provided therein a closure valve 60 which normally lies out of the path of travel of the air through the connection 39. The arrangement is such that when the valve 58 is moved in counterclockwise direction to admit air through the conduit 57 to the turbine, the valve 60 will be rotated to the closed position shown by the dotted line of Fig. 3 to terminate the flow of air through the connection 39 and the dust-separating screen 31. Thus when the valves 58 and 60 are moved from their normal position, suction through the screen is terminated, the turbine is actuated by air flow produced by the fan 20, the air being withdrawn from the turbine through the openings 56a and the screen is vigorously agitated to dislodge dirt and dust and permit the same to drop by gravity to the container 41.

For convenience in manipulating the valves, the rocker arm for actuating the valves 58 and 60 engages pitman 62 which in turn is attached to a foot treadle 63, the treadle and pitman being retained in raised position with the valve 58 closed and the valve 60 open by means of a spring 64 secured to a projection of frame 11. Thus upon depression of the foot treadle the position of the valves will be reversed and normal cleaning operation will be terminated while the bag is agitated.

From the foregoing it will be seen that the present invention provides a novel and efficient vacuum cleaner assembly wherein a compact and efficient structure provides an improved arrangement embodying a suction operated screen vibrator, a readily removable dirt receptacle as well as a tool compartment and operating efficiency indicator together with readily operated control means for the unit. It will be understood that the invention is not limited to the specific structural details here shown by way of illustration and that numerous changes and modifications may be resorted to without departure from the spirit or scope of the invention as outlined in the appended claims.

What I claim is:

1. In a vacuum cleaner, a dust collecting casing, an air inlet and an air outlet in said casing, a motor fan unit for producing a flow of air therethrough, means in said casing situated between the air inlet and outlet for filtering dust-laden air, means for agitating the filtering means, an air motor for operating said agitating means actuated by the air flow, and means for diverting said air from flowing through said filtering means to operate said air motor.

2. In a vacuum cleaner, a dust collecting casing, an air inlet and an air outlet in said casing, a motor fan unit for producing a flow of air therethrough, means in said casing situated between the air inlet and outlet for filtering dust-laden air, means for agitating the filtering means, an air motor for operating said agitating means actuated by the air flow, valve means normally biased for maintaining air flowing through said filtering means, and means for shifting said valve means against said bias for diverting said air from flowing through said filtering means to operate said air motor.

3. In a vacuum cleaner, a dust collecting casing, an air inlet and an air outlet in said casing, a motor fan unit for producing a flow of air therethrough, means in said casing situated between the air inlet and outlet for filtering dust-laden air, means for agitating the filtering means, an air motor for operating said agitating means actuated by the air flow, means providing an inlet for said air motor which is independent of said inlet in the casing, and valve means shiftable between a position interrupting flow through the inlet to said air motor and directing flow through the inlet to said casing and a position interrupting flow through the inlet to said casing and directing flow through the inlet to said air motor.

4. In a vacuum cleaner, a dust collecting casing, an air inlet and an air outlet in said casing, a motor fan unit for producing a flow of air therethrough, means in said casing situated between the air inlet and said motor fan unit for filtering dust-laden air, means for agitating the filtering means, an air motor for operating said agitating means, said air motor having an inlet from the atmosphere which is independent of the inlet to said casing and having an outlet communicating with said motor fan unit independently of the filtering means, a first valve in the inlet to said casing, a second valve in the inlet to said turbine, and means connecting said valve together for simultaneous operation so that when one is closed the other is open and vice versa.

GUSTAF E. LOFGREN.

REFERENCES CITED

The following references are of record in the file of this patent:

UNITED STATES PATENTS

| Number | Name | Date |
| --- | --- | --- |
| 1,259,008 | Fraser | Mar. 12, 1918 |
| 1,507,010 | Sutton | Sept. 2, 1924 |
| 1,933,105 | Forsberg | Oct. 31, 1933 |
| 2,031,454 | Belde et al. | Feb. 18, 1936 |
| 2,077,572 | Lofgren | Apr. 20, 1937 |
| 2,171,248 | Van Berkel | Aug. 29, 1939 |
| 2,204,590 | Hamilton | June 18, 1940 |
| 2,350,011 | Black | May 30, 1944 |
| 2,367,437 | Salt | Jan. 16, 1945 |
| 2,400,217 | White | May 14, 1946 |
| 2,409,230 | Taylor | Oct. 15, 1946 |

FOREIGN PATENTS

| Number | Country | Date |
| --- | --- | --- |
| 20,652 of 1912 | Great Britain | Sept. 10, 1913 |